United States Patent [19]

Andersson et al.

[11] Patent Number: 4,478,786
[45] Date of Patent: Oct. 23, 1984

[54] FUEL ASSEMBLY

[75] Inventors: Ingmar Andersson; Bo Borrman; Bo Fredin; Olov Nylund, all of Västerås, Sweden

[73] Assignee: AB Asea-Atom, Västerås, Sweden

[21] Appl. No.: 239,933

[22] Filed: Mar. 3, 1981

[30] Foreign Application Priority Data

Mar. 17, 1980 [SE] Sweden .................. 8002080

[51] Int. Cl.³ .................. G21C 15/02; G21C 3/32
[52] U.S. Cl. .................. 376/444; 376/377; 376/434; 376/443
[58] Field of Search .............. 376/362, 364, 434, 438, 376/440, 444, 448, 453, 462, 178, 443, 370, 445, 278, 328, 458, 373, 377, 449, 432

[56] References Cited

U.S. PATENT DOCUMENTS

| | | | |
|---|---|---|---|
| 3,036,964 | 5/1962 | Horning | 376/370 X |
| 3,122,484 | 2/1964 | Iskenderian | 376/448 |
| 3,158,543 | 11/1964 | Sherman et al. | 376/449 X |
| 3,164,530 | 1/1965 | Banks | 376/446 X |
| 3,183,164 | 5/1965 | Guild et al. | 376/328 X |
| 3,205,144 | 9/1965 | Jabsen | 376/438 |
| 3,212,984 | 10/1965 | Tollet et al. | 376/328 X |
| 3,317,398 | 5/1967 | Hutter | 326/432 X |
| 3,338,791 | 8/1967 | Lass et al. | 176/66 |
| 3,389,056 | 6/1968 | Frisch | 376/445 |
| 3,567,582 | 3/1971 | Dieuoet | 376/438 |
| 3,607,639 | 9/1971 | Van Santen et al. | 376/438 |
| 3,697,375 | 10/1972 | Suvanto et al. | 376/440 |
| 3,808,098 | 4/1974 | Fredin | 376/444 X |
| 3,861,999 | 1/1975 | Zmola | 376/444 |
| 3,879,259 | 4/1975 | Persson | 376/362 |
| 3,915,793 | 10/1975 | Andersson et al. | 376/449 |
| 4,056,441 | 11/1977 | Marmonier et al. | 376/438 |
| 4,088,534 | 5/1978 | Andrieu | 376/438 |
| 4,325,786 | 4/1982 | Wohlsen | 376/462 |
| 4,348,355 | 9/1982 | Nylund | 376/448 |

FOREIGN PATENT DOCUMENTS

| | | |
|---|---|---|
| 621561 | 12/1962 | Belgium . |
| 648637 | 9/1964 | Belgium . |
| 1816561 | 8/1969 | Fed. Rep. of Germany . |
| 2623430 | 12/1976 | Fed. Rep. of Germany . |
| 1228851 | 9/1960 | France . |
| 1246458 | 10/1960 | France . |
| 2111642 | 6/1972 | France . |
| 43767 | 7/1963 | Luxembourg . |
| 334955 | 10/1971 | Sweden . |
| 1018481 | 1/1966 | United Kingdom . |
| 1411116 | 10/1975 | United Kingdom . |
| 2054247 | 2/1981 | United Kingdom . |

Primary Examiner—Richard E. Schafer
Assistant Examiner—Daniel Wasil
Attorney, Agent, or Firm—Pollock, Vande Sande & Priddy

[57] ABSTRACT

A boiling water reactor fuel assembly is provided with an elongated, vertical stiffening device having four stiffening wings which are each attached to a wall of the fuel box. Each stiffening wing has at least one vertically directed passageway for water.

14 Claims, 16 Drawing Figures

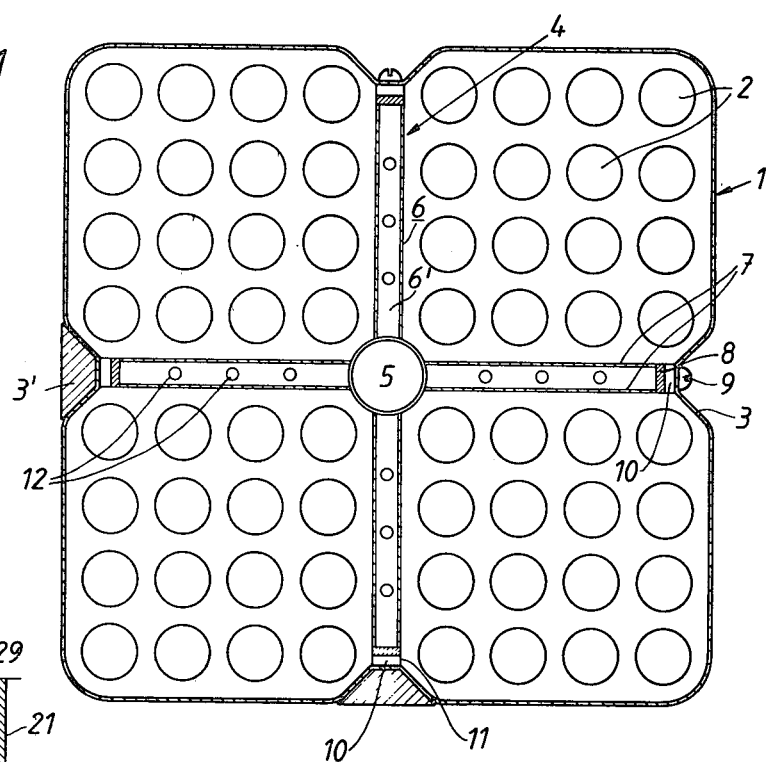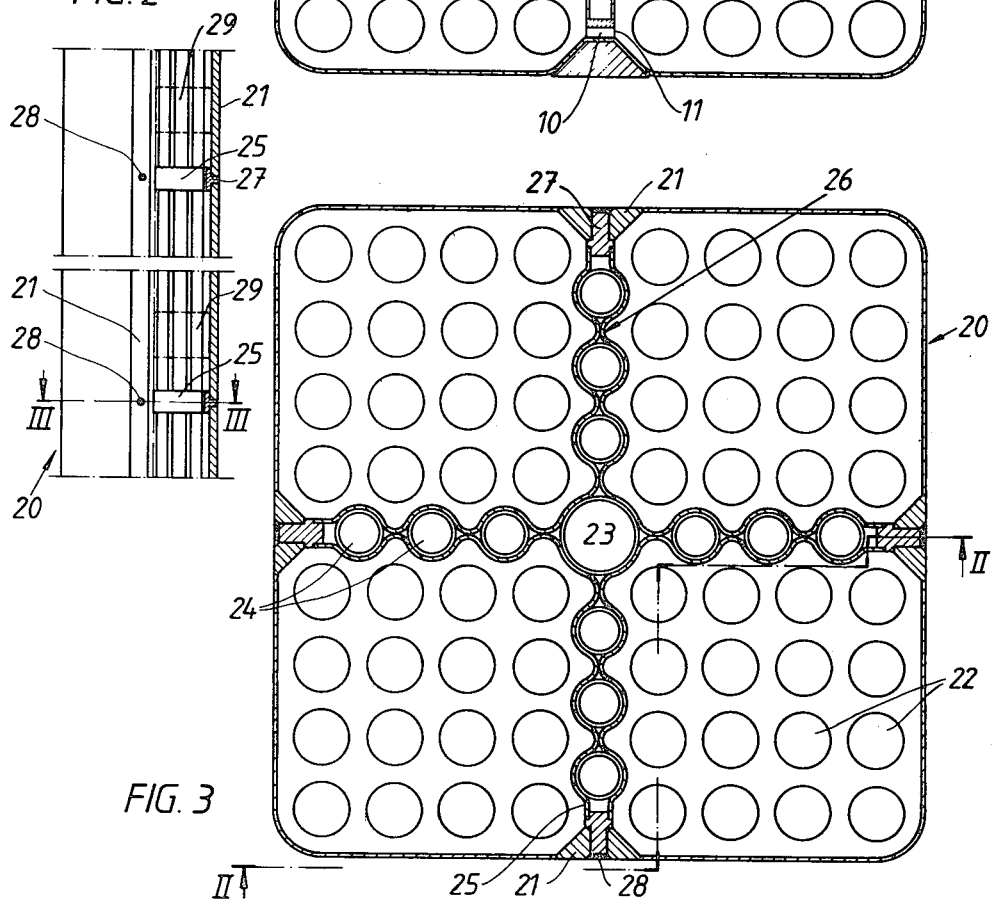

FUEL ASSEMBLY

TECHNICAL FIELD

The present invention relates to a boiling water reactor fuel assembly comprising a plurality of vertical fuel rods surrounded by a fuel channel made with substantially square cross-section and positioned in the fuel channel with the aid of a plurality of spacers, the lower end of the fuel channel being hydraulically and mechanically connected to a nozzle which is provided with an inlet opening for water. The lower ends of the fuel rods rest on a grid device, which is supported by the nozzle.

BACKGROUND ART

A fuel assembly of the above kind is disclosed in U.S. Pat. No. 3,697,375. In this and other known fuel assemblies there is a tendency to creep deformations of the walls of the fuel channel. This phenomenon is caused, among other things, by the fuel channel being subjected to fast neutrons in combination with an internal overpressure, resulting in the walls being pressed outwards and acquiring a convex outer side. Creep deformations may thus result in a reduced gap width at some place in the control rod gaps, which may jeopardize the operability of the control rods.

It is possible to counteract, at least to a certain extent, the above-mentioned pressing out of the walls of the fuel channel by providing the fuel channel with a centrally arranged stiffening device, which has a substantially cruciform cross-section along a predominant part of the vertical length of the fuel rods and is constructed in such a way that the fuel channel is divided into four vertical partial channels, each partial channel surrounding one partial bundle which comprises one-fourth of the total number of fuel rods in the fuel assemblies. Such a division into four is described in U.S. Pat. No. 3,164,530, where the stiffening device consists of four perforated dividing plates. Despite the perforation, it cannot be avoided that these dividing plates involve a considerable neutron absorption, which results in a reduced fuel economy.

DISCLOSURE OF THE INVENTION

With a fuel assembly according to the invention, the task is to stiffen the walls of the fuel channel by means of a stiffening device which has the mechanical advantages of the known stiffening device and which, in addition, has such a favourable effect on the neutron flux that the fuel economy is considerably better than with a corresponding fuel assembly without a stiffening device. This is achieved by using the stiffening device as a means for achieving in the reactor core a relatively evenly distributed moderator effect in horizontal direction, and thus a more even distribution of the neutron density, which means that the reactivity of the fuel assembly, at unchanged mean enrichment, is considerably increased, and that the differences between the fuel rods of the fuel assembly, as regards power load and burnup, are considerably reduced.

The moderator effect of the stiffening device is achieved by providing said device with at least one through-going, vertical water passageway, running along a predominant portion of the length of the fuel rods and being furnished at its lower end with an inlet opening for water flowing through. In this specification, "predominant" and "dominant" are used in their commonly accepted sense to indicate prevalence over all others in magnitude. Since the water flowing through the vertical passageways of the stiffening device is subcooled and prevented from getting into touch with the fuel rods, its void content will be extremely small and its moderator effect the maximum one.

What characterizes the invention will become clear from the appended claims.

BRIEF DESCRIPTION OF THE DRAWINGS

In the following the invention will be described with reference to the accompanying schematic drawings in which FIG. 1, FIG. 3, FIG. 4, FIG. 13 and FIG. 14 show horizontal sections through a fuel assembly according to a first, a second, a third, a fourth, and a fifth embodiment of the invention;

FIG. 2 shows a partial view as well as a partial section along II—II of FIG. 3.

FIG. 14 shows a section along XIV—XIV of FIG. 15, and

Figure 7:
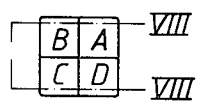
Figure 9:
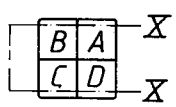
Figure 11:
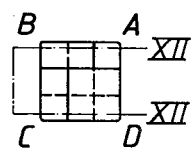
Figure 8:
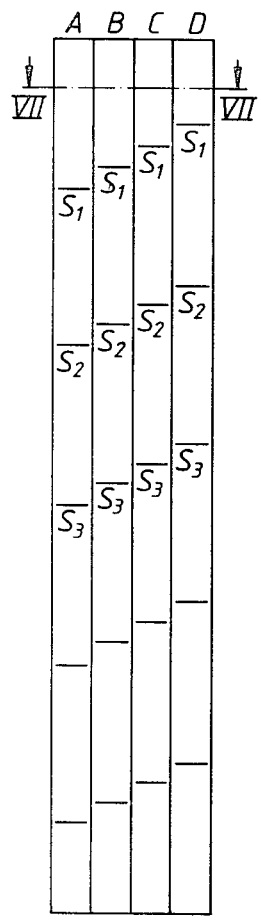
Figure 10:
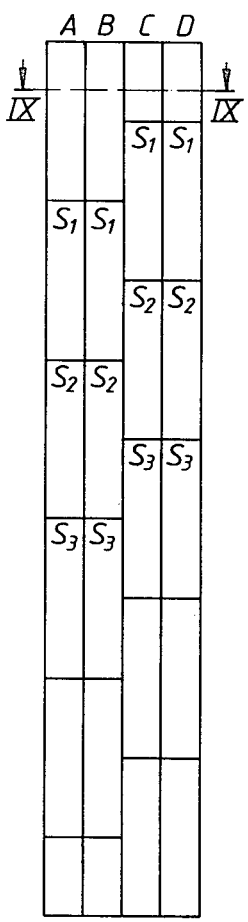
Figure 12:
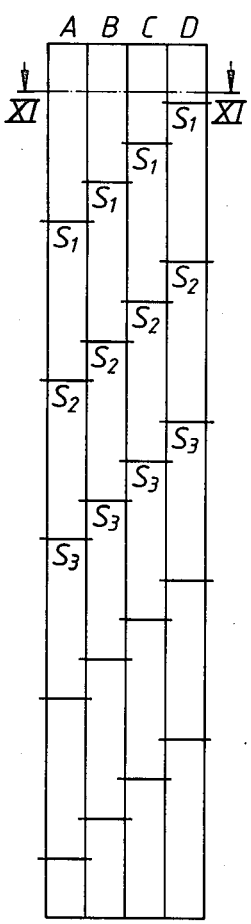

The location of the spacer devices in the fuel assemblies shown is shown schematically by means of FIGS. 7, 8, 9, 10, 11, 12;

FIGS. 7, 9 and 11 designating horizontal sections along VII—VII of FIG. 8, along IX—IX of FIG. 10, and along XI—XI of FIG. 12.

FIG. 8 shows a partial vertical section along VIII—VIII of FIG. 7,

FIG. 10 shows a partial vertical section along X—X of FIG. 9, and

FIG. 12 a partial vertical section along XII—XII of FIG. 11.

BEST MODE FOR CARRYING OUT THE INVENTION

In FIG. 1, 1 designates a fuel channel formed from Zircaloy ® sheet and positioned around sixty-four fuel rods 2. The walls of the fuel channel are each provided with a stiffening ridge 3 in the form of a folded-in sheet-metal portion running along the entire height of the fuel channel, or as an alternative, a ridge formed as a strip 3' of Zircaloy ® running along a predominant part of the vertical extension of the fuel channel. The strip 3' may either be welded to the inner side of a continuous sheet-metal wall, or four such strips may be welded to four L-shaped sheet-metal elements in such a way that a substantially square fuel channel is formed. The wall portion, to the inner side of which the strip 3' is welded, or alternatively the strip itself, is arranged to project forward somewhat, thus obtaining a suitable sliding surface for a control rod. Along a predominant portion of its length, the fuel channel is provided with a stiffening device 4, which is made of Zircaloy ® and with a cruciform cross-section. The stiffening device 4 has a central water tube 5 with four welded-on hollow wings 6, which are each attached to a ridge 3 or 3'. Each wing 6 is composed of two parallel, vertical sheet-metal walls 7 and a wall 8 arranged perpendicular thereto and at a distance to the ridge 3 or 3'. Each wall 8 is rigidly attached to a corresponding ridge 3 or 3' by means of a plurality of rivets 9, which are each passed through a distance block 10, thus forming a plurality of horizontal channels 11 between each wall 8 and the corresponding ridge. Said channels form pressure-equalizing, hydraulic connections between the four fuel box sections which are defined by means of the stiffening device 4. The lower ends of the stiffening wings 6 are provided with end walls in which inlet openings 12 for water are arranged, the cavity 6' of the stiffening device 4 thus being traversed with water in a vertical direction, thus obtaining a favourable moderating effect. As shown in FIG. 1, the total average cross-sectional area of cavities 6' and tube 5 is the dominant part of the total average cross-section of stiffening device 4. The inlet openings 12 are communicating with the nozzle of the fuel assembly via corresponding openings made in a bottom grid supporting the fuel rods 2, or in a cruciform member similar to the member 90 described below. The nozzle may be similar to the nozzle shown in FIG. 3a.

A plurality of fuel rod spacers surround the fuel rods within a corresponding quadrant of the fuel channel 1 and are accomodated within a partial channel limited by two stiffening wings 6 together with two mutually perpendicularly oriented portions of fuel channel walls. In each quadrant, such spacers are arranged at different levels, each spacer surrounding a group of sixteen fuel rods. Each such group of fuel rods can then be inserted and removed individually.

Figure 3A:
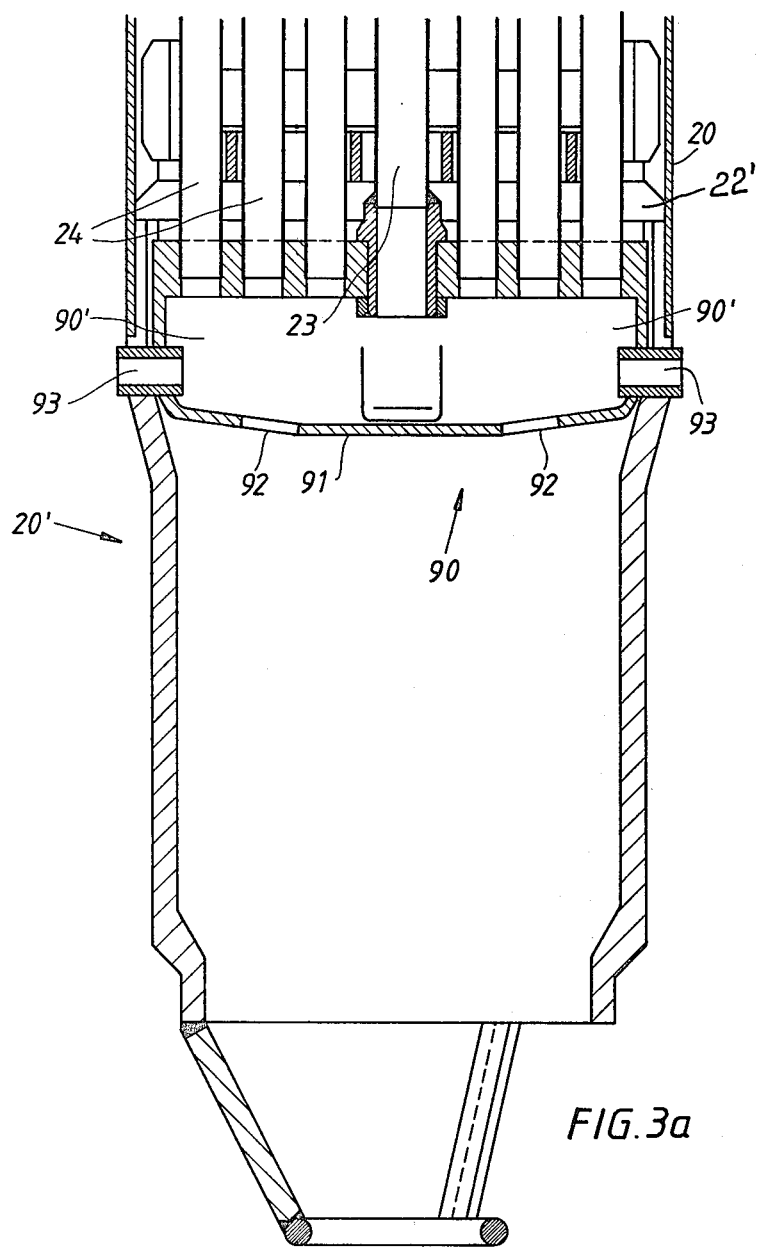
FIG. 3a shows a partial vertical section taken through the center line of the fuel assembly shown in FIG. 3 and perpendicular to two of its fuel channel walls.

In the embodiment of a fuel assembly according to the invention as shown in FIGS. 2, 3 and 3a, each of the walls of the fuel box 20 is formed with one single, relatively long, vertical stiffening strip 21. Alternatively, each wall may instead be formed with a folded-in sheet-metal portion having the same shape as the ridge 3 in FIG. 1. The fuel rods of the fuel assembly are designated 22. The fuel assembly has a central, relatively thick water tube 23 which together with twelve thinner water tubes 24 are arranged in a cruciform configuration. In different level areas, the water tubes 23 and 24 are connected to each other by means of four wavy, substantially L-shaped bands 25 of Zircaloy ®, which are welded to each other and preferably also to the water tubes 23 and 24. Thus, the water tubes together with the bands 25 attached to them constitute a stiffening device 26 having a substantially cruciform cross-section. In each of the spiders formed by the bands 25 the spider arms are arranged in rigid mechanical connection with a stiffening strip 21 with the aid of a block 27 welded to the end of the spider arm, which block 27 is inserted into a corresponding hole in the stiffening strip 21 and attached thereto by a welded joint 28. Within each quadrant of the fuel box 20, the fuel rods 22 are positioned with the aid of a plurality of spacer devices 29 arranged at different levels, each spacer device then only surrounding fuel rods arranged in the corresponding quadrant. The fuel rods of the quadrants constitute corresponding groups which can be inserted and removed individually.

Alternatively, spacers may be used which are each arranged to surround all the fuel rods surrounded by the fuel channel and also the water tubes 23 and 24.

The fuel rods 22 rest on a bottom grid 22', supported by a nozzle 20' which is mechanically and hydraulically connected to the fuel channel 20. The nozzle 20', which is provided at its lower end with an inlet opening for water flowing through the fuel assembly, also supports a cruciform water distributing member 90 for the water flowing through the tubes 23 and 24. The water distributing member 90 is formed with four hollow, radially directed arms 90', which make an angle of 90° with one another. The arms extend from the mid-portion of the distributing member, which mid-portion supports the central water tube 23 which, similar to tubes 24, is hydraulically connected to the hollow water distributing member 90. Each of the four arms 90' supports one group of three water tubes 24. The water distributing member 90 has a cruciform bottom 91, which is provided with four inlet openings 92. The arms 90' are provided with a plurality of connecting tubes 93 intended to constitute hydraulic connections between the distributing member 90 and the water gaps located outside the fuel assembly.

Other embodiments of the invention have nozzles similar to the nozzle 20'. In certain cases, however, especially when the vertical water passageways of the stiffening device are in hydraulic communication with the outside of the fuel channel via a plurality of openings in the fuel channel walls, an alternative design is used in which the connecting tubes 93 and the bottom 91 are omitted.

Figure 4:
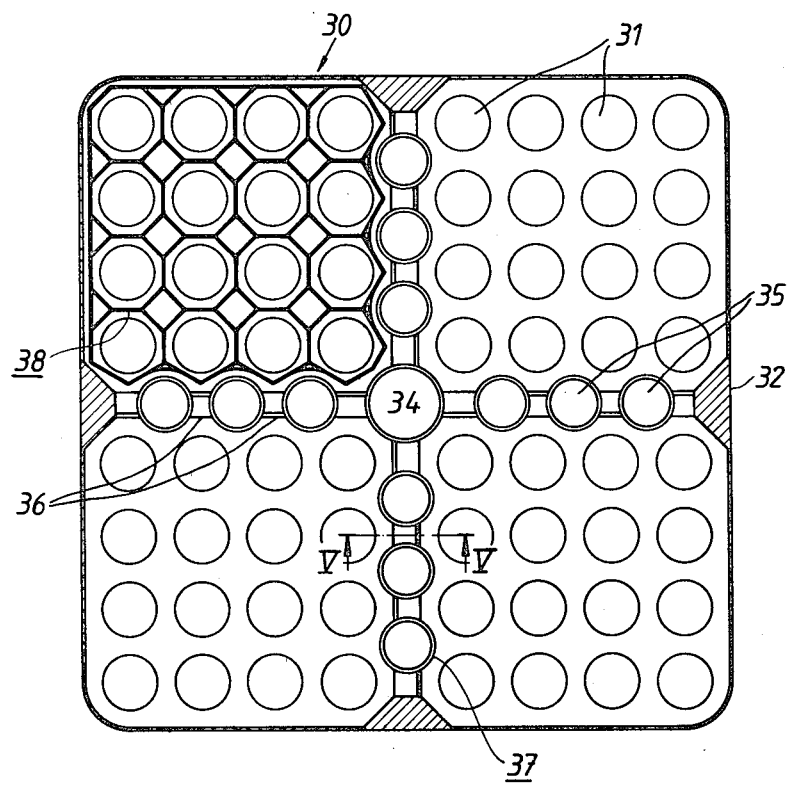
Figure 5:
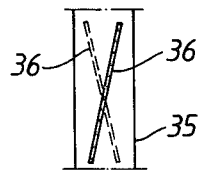
FIG. 5 shows a section along V—V of FIG. 4.

In the embodiment shown in FIGS. 4 and 5, the fuel rods 31 of the fuel assembly are surrounded by a fuel channel 30, in which each wall is provided with a stiffening ridge in the form of a stiffening strip 32 fixed by welding. Alternatively, the strip 32 may be replaced by a folded-in wall portion. In the same way as shown in FIG. 3, a relatively large water tube 34 is arranged together with twelve smaller water tubes 35 in a cruciform configuration. In each of a plurality of different levels, a plurality of mechanical connecting elements 36 are arranged between mutually adjacent water tubes, so that said water tubes together with the connecting elements 36 form a stiffening device 37 which has a substantially cruciform cross-section. The mutual distance between such levels is at least as large as the vertical dimension of the connecting elements 36, which means that good hydraulic connections are obtained between adjacent quadrants of the fuel channel and thus an efficient pressure equalization therebetween. Each connecting element 36 is arranged to make an acute angle with a vertical plane through the support arms in which they are included, which results in reactor coolant upon passage of a connecting element acquiring a horizontal speed component. As will be clear from FIG. 5, the obliquity is made in different directions for connecting elements disposed at the same level and included in one and the same stiffening wing. Suitably, elements arranged immediately adjacent to each other in horizontal direction are arranged with a deviating deflecting direction from element to element, as indicated in FIG. 5. The horizontal speed components caused by the obliquely arranged elements, give the effect that a flow of cooling water, which in a lower portion of the fuel channel is flowing along a certain fuel rod only, may further up be distributed among a plurality of fuel rods. Thus, a more even temperature distribution is obtained.

Figure 6:
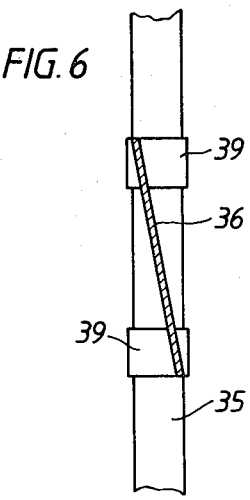
FIG. 6 shows a corresponding section for an alternative detailed embodiment.

Instead of welding the connecting elements 36 directly to the water tubes, the water tubes may advantageously be provided with sleeves 39 and the connecting elements be welded to said sleeves, as shown in FIG. 6.

The quadrants of the fuel channel each includes a bundle of sixteen fuel rods. These are surrounded by a plurality of spacer devices 38 arranged vertically one after the other. Each spacer device comprises a plurality of spacer grid cells sufficient in number to accommodate a minor portion, usually one-fourth, of the total number of fuel rods in the fuel channel.

Figure 13:
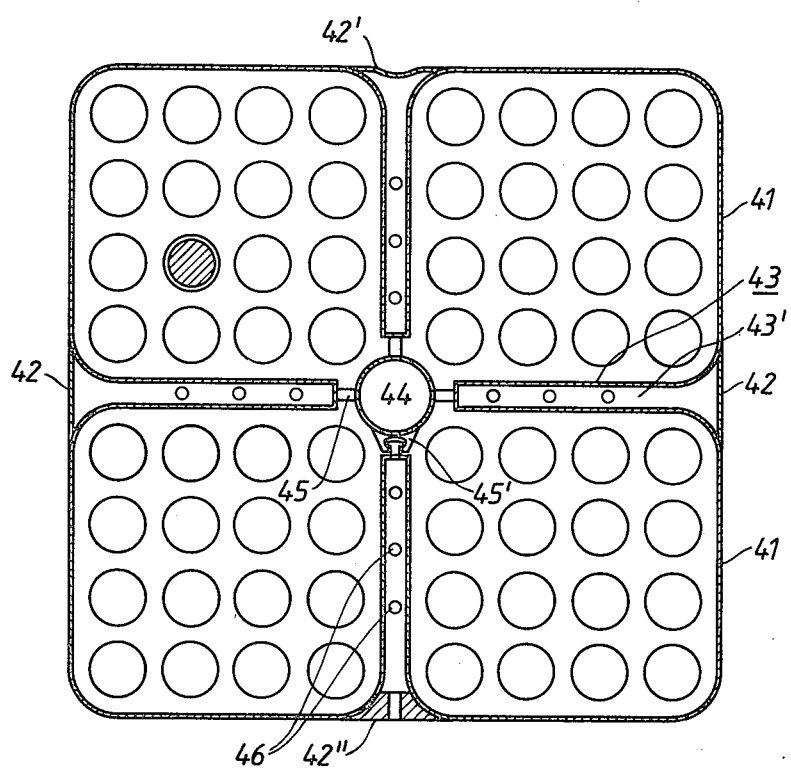

In the fuel assembly shown in FIG. 13, each wall of the fuel channel 41 is made with a strongly folded-in mid-portion so as to form four hollow stiffening wings 43. Each of these is attached to a central water tube 44 with the aid of a plurality of rigidly fixed connecting members 45, arranged at a mutual vertical distance, or alternatively, with the aid of flexible connecting members 45'. The cavities of the stiffening wings constitute vertical passageways 43' which are supplied with water of relatively low temperature via a plurality of openings 46 in the bottom grid of the fuel assembly. The passageways 43' may be formed without any horizontal communication with the outside of the fuel channel by defining each passageway 43' in a direction radially outwards by means of a welded channel wall 42 with no through-holes. As an alternative, a perforated channel 42" may be used. By choosing the thickness of the channel wall 42 or 42", the demands made with regard to the safety of the reactor against earthquakes are taken into account. If these demands are relatively small, instead of walls according to any of alternatives 42 and 42"', there may be used a plurality of, for example curved, connecting elements 42' arranged one after the other in a vertical direction and with a mutual distance. In this way an unnecessary great stiffness of the fuel assembly may be avoided, and reduced friction forces may be obtained at contact surfaces between fuel assembly and control rod.

A design according to FIG. 13 implies that fuel channels for a plurality of reactors, with greatly varying demands regarding seismic safety, may substantially be manufactured by the same method, the same tools and the same materials. The adaptation to specific reactor demands is made by a suitable dimensioning of the channel walls 42, or 42", or of the connecting elements 42' if these are used instead.

Figure 14:
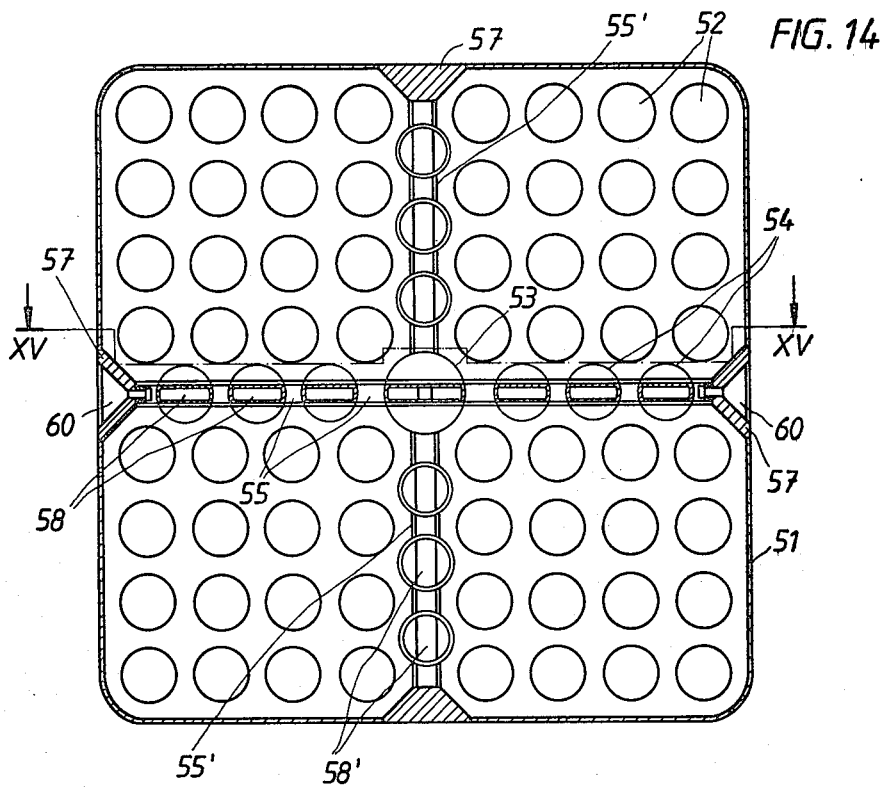
Figure 15:
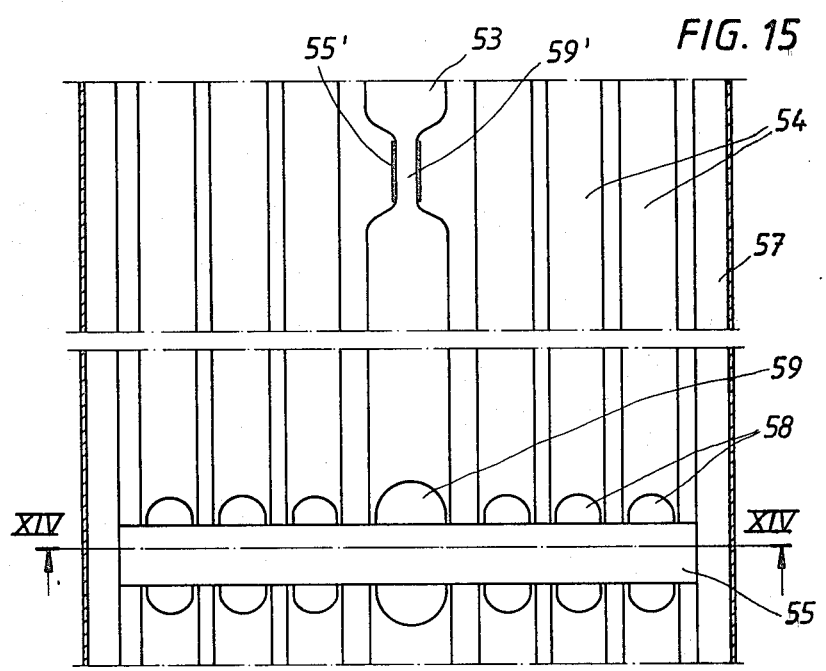
FIG. 15 shows a section along XV—XV of FIG. 14.

In FIGS. 14 and 15, 51 designates a fuel channel surrounding sixty-four vertical fuel elements 52, which are positioned by means of a plurality of spacers (not shown) of the type shown in FIG. 4. The fuel channel also surrounds twelve water tubes 54 having a relatively small cross-section and a central water tube 53 of relatively large cross-section. At a lower level six water tubes 54 are each provided with a flattened portion 58 and the central water tube 53 with a flattened portion 59. Corresponding flattened portions 58' and 59' are to be found at an upper level.

At said lower level, the flattened tube portions 58 and 59 are squeezed betweem two straight, horizontal bars 55, and at said upper level two bars 55' are arranged in a corresponding manner. Seen from above, the bars 55 make an angle of 90° with the bars 55'. Four vertical bars 57 are each included in a fuel channel wall, each of the horizontal bars 55 being fixed to two bars 57 located opposite to each other by means of screws 60. A plurality of horizontal bars 55 are fixed to each of the bars 57. An arrangement shown on FIGS. 14 and 15 has the advantage, compared with the designs of FIGS. 3 and 4, that the minimum distance between a connecting member attached to the water tubes and the nearest fuel rod is larger with the arrangement shown in FIGS. 14 and 15 than with the designs shown in FIGS. 3 and 4.

It will be clear from the foregoing that all the embodiments of a fuel assembly according to the invention shown on the drawings are well suited for a division of the fuel rods into four bundles. The fuel rods surrounded by the fuel preferably are distributed in four equally large bundles, each bundle or assembly including a plurality of spacer devices, each spacer device being designed to position a minor portion only, usually one-fourth of the total number of fuel rods in the assembly. When using such spacer devices, it is possible to deviate from the conventional principle, according to which the number of grid cells arranged in one and the same horizontal plane is equal to the total number of fuel rods in the fuel box, and it has proved that this may lead to a number of different advantages. A fuel assembly according to the invention is preferably made in such a way that a plurality of groups of the above-mentioned, partially positioned space devices are arranged axially one after the other in the fuel box, each group then containing a plurality of spacer devices arranged at least at two different levels, and the spacer devices of each group together positioning all of the fuel rods surrounded by said fuel box. Examples of locations of fuel assemblies constructed in this manner are shown schematically with the aid of FIGS. 7, 8, 9, 10, 11, 12, the four quadrants of the fuel boxes being designated A, B, C, D, and each spacer with S and an index, each one of the above-mentioned groups of partially positioned spacers having an index characteristic of the group.

The arrangement of the spacers described with reference to FIGS. 7-12 involves a number of advantages, among other things an improved water redistribution between portions of the fuel assembly having different loads.

We claim:

1. A fuel assembly for a boiling water reactor, said fuel assembly including a plurality of vertical fuel rods enclosed within a fuel channel separate from said fuel rods, said fuel channel being of substantially rectangular cross-section, wherein said fuel rods are positioned with the aid of a plurality of spacer devices, said fuel channel surrounding an elongated stiffening device for said fuel channel, said stiffening device being separate from said fuel rods and extending along a predominant portion of the length of said fuel rods, the vertical center line of said stiffening device lying in the vicinity of the vertical center line of said fuel channel, said stiffening device having four stiffening wings arranged in vertical planes and having angular distances of about 90° between themselves, said stiffening wings extending along a predominant portion of the length of said fuel rods, each of said stiffening wings being separate from said fuel rods and mechanically connected to the three remaining stiffening wings in the vicinity of said vertical center line of said stiffening device, said stiffening wings being mechanically connected to corresponding walls of said fuel channel to prevent said fuel channel from deforming outwardly during reactor operation, said wings constituting partitions between four bundles of fuel rods and each of said wings comprising at least one vertical internal water passageway extending along said predominant portion of the length of said fuel rods, said internal passageways communicating with at least one inlet opening for water provided at the lower end of said stiffening device, at least one mechanical connection in the vicinity of said vertical center line being in the upper portion of said stiffening device, whereby water while flowing upward through said internal water passageways is prevented from contacting said fuel rods, thus providing a minimized void content and a maximized moderator effect along said internal water passageways.

2. Fuel assembly according to claim 15, wherein at least one of said water passageways is arranged in hydraulic communication with the surroundings of said fuel assembly via a perforated portion of a fuel channel wall.

3. Fuel assembly according to claim 1, wherein the total average cross-section of said water passageways of said stiffening device comprises dominant part of the total average cross-section of said stiffening device.

4. Fuel assembly according to claim 1, wherein each of said stiffening wings comprises two elongated, vertical, mutually parallel and mutually spaced-apart sheet-metal portions, defining said at least one water passageway.

5. Fuel assembly according to claim 4, wherein said stiffening device at a plurality of different levels is provided with a plurality of hydraulic connections between said bundles.

6. Fuel assembly according to claim 1, wherein each of said walls of said fuel channel has an inwardly-folded mid-portion which forms a U-shaped projection, directed towards the vertical centre line of the fuel channel, said projection being mechanically connected to a vertically extending, central water tube.

7. Fuel assembly according to claim 1, wherein a plurality of vertical water tubes are arranged in a cruciform configuration and, at each of a plurality of separate level sections, provided with a plurality of transversely extending mechanical connecting elements, said water tubes together with said connecting elements constituting said stiffening device.

8. Fuel assembly according to claim 7, wherein said fuel rods are divided into four equal bundles by said stiffening wings, the fuel rods of each bundle being positioned by a plurality of groups of spacer devices arranged between the upper and lower ends of said bundles, each of said groups of spacer devices positioning in said fuel channel all of said fuel rods, each of said groups being composed of four separate spacer devices, each spacer device comprising a plurality of spacer grid cells, the total number of spacer grid cells in each of said spacer devices being sufficient to accommodate a minor portion of the number of said fuel rods, the spacer devices belonging to one and the same group of spacer devices being disposed at least at two different levels within said fuel channel with each spacer device at a corresponding corner of said fuel channels.

9. Fuel assembly according to claim 7, wherein a plurality of said mechanical connecting elements have surfaces which are obliquely arranged in relation to vertical planes in such a way that upwardly-flowing water acquires a horizontal speed component by streaming along said surfaces.

10. Fuel assembly according to claim 7, wherein each of said transversely extending connecting elements consists of a substantially straight, horizontal bar and that the bars in a first pair of such bars are arranged at a first level and at one side each of a first group of water tubes, the bars in a second pair of such bars being arranged at a second level and at one side each of a second group of water tubes, the horizontal projection of said first pair making an angle of 90° with the horizontal projection of said second pair, each water tube portion, located between two bars included in a pair, being locally flattened to provide plane contact surfaces for mechanical contact with the bars of the pair.

11. Fuel assembly according to claim 1, wherein the walls of said fuel channel are each formed with a vertically extending stiffening ridge, which is mechanically connected to one of said wings.

12. Fuel assembly according to claim 11, wherein said ridge consists of an inwardly-folded wall portion.

13. Fuel assembly according to claim 11, wherein said ridge comprises a vertical strip.

14. Fuel assembly according to claim 13, wherein said vertical strip has an outwardly-facing plane strip surface, the distance of which from the vertical centre axis of the fuel channel is greater than the corresponding distance for the other outwardly-facing plane surfaces of the channel wall in which the strip is included thereby providing a suitable sliding surface for a control rod.

* * * * *